(12) United States Patent
Busha et al.

(10) Patent No.: US 8,672,016 B2
(45) Date of Patent: Mar. 18, 2014

(54) FOLDING END CAP

(75) Inventors: Bryan Busha, Grand Blanc, MI (US); Christopher R. Hammond, Rochester Hills, MI (US); Joseph P. Wieczorek, Lake Orion, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 371 days.

(21) Appl. No.: 11/651,640

(22) Filed: Jan. 10, 2007

(65) Prior Publication Data

US 2008/0163987 A1 Jul. 10, 2008

(51) Int. Cl.
*B60J 1/20* (2006.01)
(52) U.S. Cl.
USPC .................................... 160/370.22
(58) Field of Classification Search
USPC ............ 160/265, 23.1, 24, 370.22, 323.1, 21, 160/39; 296/98, 24.43, 37.16, 96, 34.43
See application file for complete search history.

(56) References Cited

U.S. PATENT DOCUMENTS

| | | | |
|---|---|---|---|
| 1,181,499 A * | 5/1916 | zeman | 160/28 |
| 4,059,938 A | 11/1977 | Aimar | |
| 4,781,234 A | 11/1988 | Okumura et al. | |
| 4,951,909 A * | 8/1990 | Russo et al. | 248/206.2 |
| 5,495,884 A * | 3/1996 | Shikler | 160/120 |
| 5,618,077 A * | 4/1997 | Ament et al. | 296/37.16 |
| 5,676,415 A | 10/1997 | Ament et al. | |
| 5,813,449 A * | 9/1998 | Patmore et al. | 160/370.22 |
| 5,881,793 A * | 3/1999 | Righter et al. | 160/323.1 |
| 5,934,354 A | 8/1999 | Price et al. | |
| 5,947,358 A | 9/1999 | Wieczorek | |
| 5,961,172 A | 10/1999 | Ament et al. | |
| 6,039,105 A | 3/2000 | Patmore et al. | |
| 6,079,683 A * | 6/2000 | Lin | 248/292.12 |
| 6,125,908 A * | 10/2000 | Ament et al. | 160/323.1 |
| 6,183,028 B1 | 2/2001 | Ament et al. | |
| 6,213,186 B1 | 4/2001 | Torres et al. | |
| 6,244,778 B1 * | 6/2001 | Chesbrough | 403/51 |
| 6,279,639 B1 | 8/2001 | Schlecht et al. | |
| 6,483,027 B1 | 11/2002 | Howard et al. | |
| 6,488,325 B1 | 12/2002 | Ehrenberger et al. | |
| 6,592,165 B2 | 7/2003 | Ament et al. | |
| 6,691,965 B1 * | 2/2004 | Lin | 248/274.1 |
| 6,709,039 B1 | 3/2004 | Davenport | |
| 6,715,525 B2 | 4/2004 | Ehrenberger et al. | |
| 6,876,493 B1 * | 4/2005 | Lin | 359/461 |
| 6,913,303 B2 * | 7/2005 | Kobiela et al. | 296/1.01 |
| 6,918,623 B2 | 7/2005 | Hansen et al. | |
| 6,921,119 B2 | 7/2005 | Haspel et al. | |

(Continued)

OTHER PUBLICATIONS boss. Dictionary.com. Dictionary.com Unabridged (v 1.1). Random House, Inc. http://dictionary.reference.com/browse/boss (accessed: Mar. 20, 2009).*

*Primary Examiner* — Katherine Mitchell
*Assistant Examiner* — Candace L Bradford
(74) *Attorney, Agent, or Firm* — Raggio & Dinnin, P.C.

(57) ABSTRACT

An end cap for use in a shade assembly in a vehicle. The end cap is capable of folding and includes a base and a linkage pivotally connected to the base. The end cap also includes an extension pivotally connected to the linkage. The folding end cap will allow for the effective length of the end cap to be reduced by pivoting the extension of the end cap in an approximate 180° arc such that it engages and is secured to the base on an outer surface thereof.

22 Claims, 3 Drawing Sheets

(56) References Cited

U.S. PATENT DOCUMENTS

| | | | |
|---|---|---|---|
| 6,938,666 B1 * | 9/2005 | Ulriksen et al. | 160/98 |
| 6,966,591 B2 | 11/2005 | Schlecht | |
| 7,014,239 B2 * | 3/2006 | Ehrenberger | 296/37.1 |
| 7,017,965 B2 * | 3/2006 | Sitzler et al. | 296/24.43 |
| 7,021,692 B2 | 4/2006 | Laudenbach et al. | |
| 7,028,872 B2 | 4/2006 | Lobanoff | |
| 7,143,805 B1 * | 12/2006 | Weir | 160/370.22 |
| 7,337,823 B2 * | 3/2008 | Wieczorek et al. | 160/24 |
| 7,392,834 B2 * | 7/2008 | Davenport et al. | 160/24 |
| 7,591,296 B2 * | 9/2009 | Busha et al. | 160/24 |
| 7,644,972 B2 * | 1/2010 | Lim | 296/37.1 |
| 7,779,887 B2 * | 8/2010 | Hammond et al. | 160/323.1 |
| 2005/0072088 A1 * | 4/2005 | Colson et al. | 52/473 |
| 2006/0225843 A1 * | 10/2006 | Shell et al. | 160/24 |
| 2008/0239730 A1 * | 10/2008 | Chien | 362/368 |
| 2009/0102226 A1 * | 4/2009 | Busha et al. | 296/97.8 |

\* cited by examiner

FOLDING END CAP

BACKGROUND OF THE INVENTION

1. Field of the Invention

The subject invention generally relates to vehicle roller shade assemblies, and more particularly relates to a vehicle roller shade assembly having a folding end cap.

2. Description of Related Art

Security shades and window coverings are well known in the prior art of vehicles. In particular, security shades have been used in the prior art for covering rear compartments of SUV's or hatchback vehicles, shades for covering automobile windows, or rollers for barrier nets and the like. These shades have all been well known and used in the art for numerous years. Generally, these shade assemblies are valuable accessories to most consumers, however, it is often desirable to remove the roller from the vehicle, thus making ease of installation or removal from the vehicle a key feature of the device. Another key feature of the device is the ability to use the security shade in a variety of positions within the automobile vehicle, thus requiring a change in the length of the roller or end caps for the security shade to allow for such variety of uses within an automotive vehicle interior.

Many of these prior art shade assemblies that are used as security shades are built in numerous variations and with multiple lengths for a single model vehicle or across a larger vehicle line. For example, many of the security shades are typically mounted in the brackets between the interior trim panels inside of a motor vehicle. If the distance between the two interior panels varies between cars of the same production by either numerous inches, tenths of inches, or the like, the shade assembly must still be able to fit between the panels and not rattle back and forth within the vehicle. Therefore, the ability to have a two position end cap that will change the overall length of a roller of a security shade will allow for a single vehicle security shade to be used across numerous vehicle lines, not just a specifically designed and built single model security shade as has been the case in most prior art shade assembly systems.

Many of these prior art vehicle security shades have a roller that utilizes end caps at the end of the rollers and generally either one or both of them are spring loaded on their respective ends of the rollers. To install the rollers, the end caps are compressed to fit the roller into the brackets, and when released the spring or springs in the end caps exert an axially outward force against the brackets on the trim panels, keeping the roller in place within the vehicle interior. Many of these spring loaded designs also provide a self centering action which allows for easy installation or removal of such vehicle security shades even with one hand.

There have been many attempts within the prior art to secure the roller within the brackets, which have been met with relative amounts of success. Generally, many of these devices typically add weight and/or cost to the shade and/or limit the advantages of the floating end caps thus making the shade significantly more difficult to install or remove. Therefore, there is a need in the prior art for a novel and improved end cap for use with a security shade or shade assembly within a vehicle. There also is a need in the prior art for a folding end cap that will in effect reduce the length of the shade assembly to allow for a single shade assembly to be used over a variety of vehicle lines having a variety of lengths within the interior of the vehicles. Furthermore, there is a need in the art for an end cap that will allow for a pivoting action to create a two position end cap that can be used on one or both ends of a roller system to effectively allow for three variations of length if an end cap is used on both ends according to the present invention. This will greatly reduce the cost to manufacture and design a vehicle security shade for use across multiple vehicle lines of an automotive manufacturer. There also is a need in the art for an easier design and more efficient methodology of creating an end cap that can have varying lengths for use in various positions within a single vehicle or for use in multiple model lines across entire vehicle lines of an automotive manufacture.

SUMMARY OF THE INVENTION

One object of the present invention may be to provide an improved end cap for use in a vehicle.

Another object of the present invention may be to provide a folding end cap for use in an automotive vehicle.

Still another object of the present invention may be to provide a folding end cap that is capable of operating within a motor vehicle interior at predetermined lengths.

Still another object of the present invention may be to provide an end cap for a vehicle shade assembly that includes a base and an extension.

Still another object of the present invention may be to provide an end cap that includes a linkage arranged between a base and an extension to provide for a first and second position for the end cap.

Still another object of the present invention may be to provide an end cap that is easier to manufacture and reduces the costs to the automotive manufacturer.

Still another object of the present invention may be to provide an end cap for use on a security shade that is capable of being used across multiple vehicle lines and models for an automotive manufacturer.

Yet another object of the present invention may be to provide a vehicle security shade that includes a folding end cap arranged on one or both ends of the security shade.

To achieve the foregoing objects, a shade assembly for use in a vehicle is disclosed. The shade assembly includes a roller, and a shade panel having one end attached to the roller. The assembly also includes an end cap mounted to at least one end of the roller and adapted to engage a portion of the vehicle to support the assembly therein. The end cap having a base, a linkage pivotally connected to the base, and an extension pivotally connected to the linkage on an end opposite of the end connected to the base.

One advantage of the present invention may be that it provides a novel and improved end cap for use with a vehicle shade assembly in a vehicle.

A further advantage of the present invention may be that it allows for an adjustable effective length of a security shade via the use of a folding end cap on one or both ends of the security shade.

Still another advantage of the present invention may be that it provides for the use of a novel end cap that is capable of being used along with a security shade over numerous vehicle lines of an automotive manufacturer because of the effective numerous lengths that can be used with the end caps according to the present invention.

Yet a further advantage of the present invention may be that it creates an easier to manufacture end cap and an end cap that reduce costs to the automotive manufacturer.

Still another advantage of the present invention is that it may provide a folding end cap that includes a base and an extension wherein the base and extension are connected via a linkage.

Still another advantage of the present invention is that it may provide a folding end cap that pivots or rotates in a 180° arc between a first or standard position and a second or folded position.

Still another advantage of the present invention is that it may provide a folding end cap that effectively reduces the length of an end cap by the entire length of an extension thereof.

Other objects, features and advantages of the present invention will become apparent from the subsequent description and the appended claims, taken in conjunction with the accompanying drawings.

DESCRIPTION OF THE EMBODIMENT(S)

Figure 1:
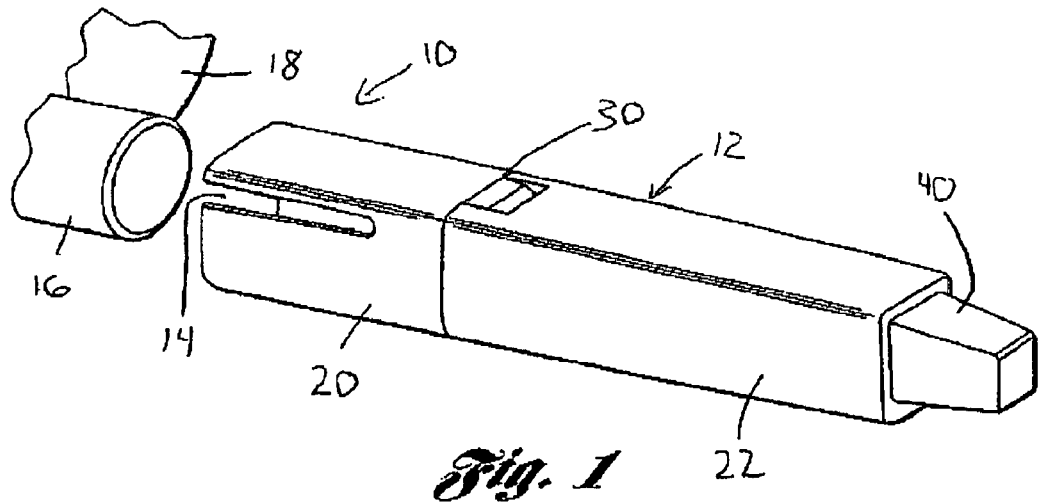
FIG. 1 shows an end cap according to the present invention for use with a vehicle shade assembly.

Referring to the drawings, an end cap 10 for use in a security shade assembly 12 within a vehicle is disclosed. It should be noted that the end cap 10 shown is a folding end cap, that is capable of being folded to reduce its effective length and hence, the length of the vehicle shade assembly 12 for use in an automotive vehicle. It should be noted that the end cap 10 can be used on one or both ends of a vehicle shade assembly 12 thus allowing for up to three different effective lengths for a vehicle shade assembly 12 according to the present invention. The use of the folding end cap 10 according to the present invention will allow for an automotive manufacturer to use one shade assembly 12 over numerous vehicle lines and vehicle models within the vehicle lines of such automotive manufacturers. This will in effect reduce the cost of designing and manufacturing the end caps 10 for shade assemblies within the interior of automotive vehicles. It should further be noted that the end cap 10 can be used on any type of shade assembly 12 within an automotive vehicle including but not limited to security shades, shades for covering automobile windows, rollers for barrier nets, and any other type of shade or barrier that is used within an automotive or any other type of vehicle. The end cap 10 according to the present invention will allow for ease of use for the person installing such into an automotive vehicle or for the consumer who purchases such device in an after market capacity.

Figure 2:
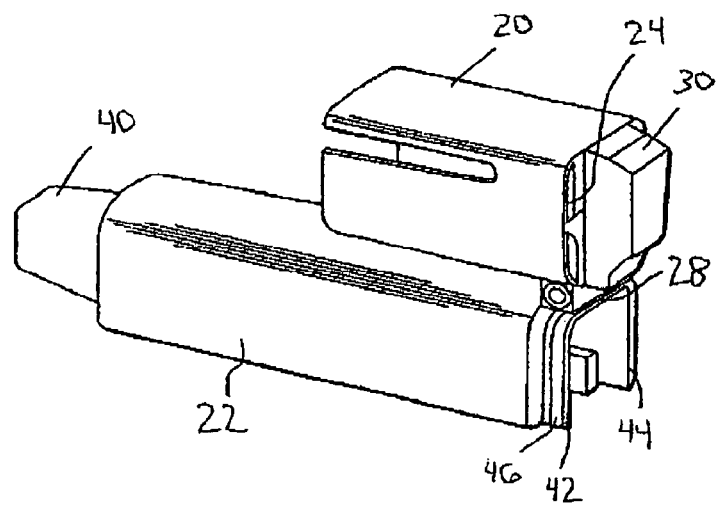
FIG. 2 shows the end cap according to the present invention in its second or folded position.
Figure 3:
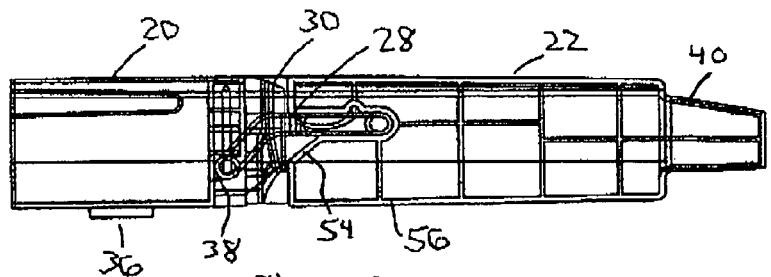
FIG. 3 shows a cross section of the end cap in its standard position.
Figure 4:
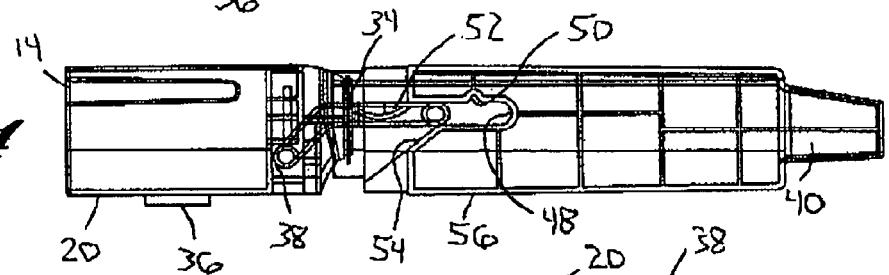
FIG. 4 shows the end cap according to the present invention in a pulled apart position.
Figure 5:
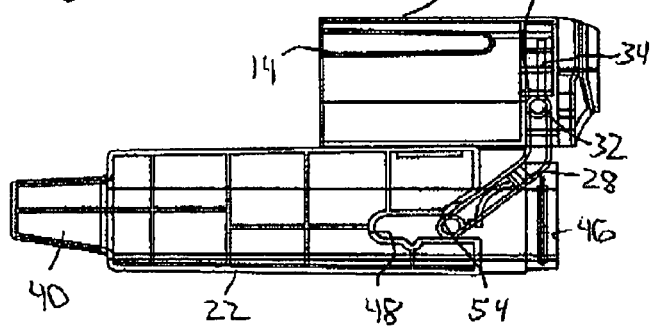
FIG. 5 shows the end cap in its flipped or folded position according to the present invention.
Figure 6:
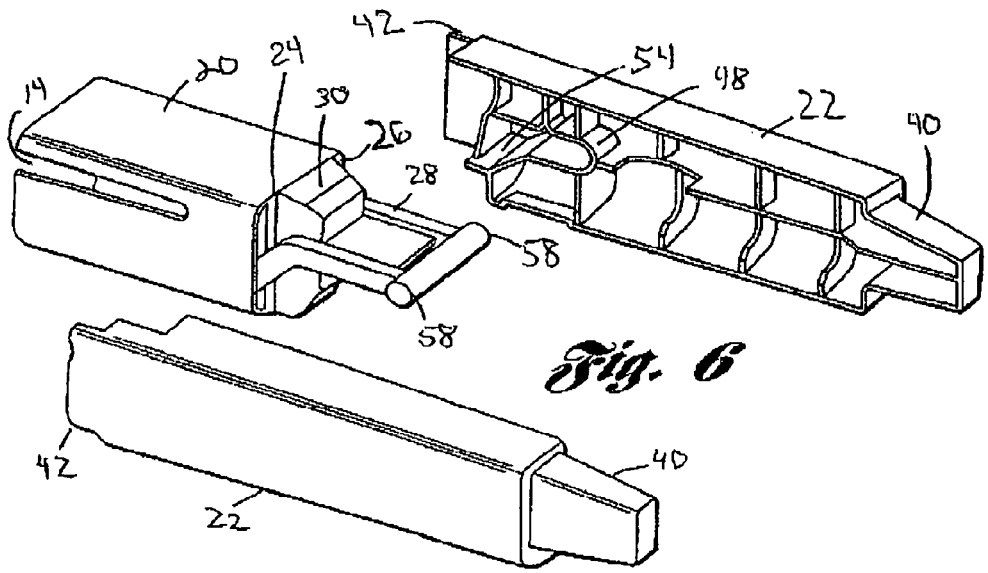
FIG. 6 shows an exploded view of an end cap according to the present invention.
Figure 7:
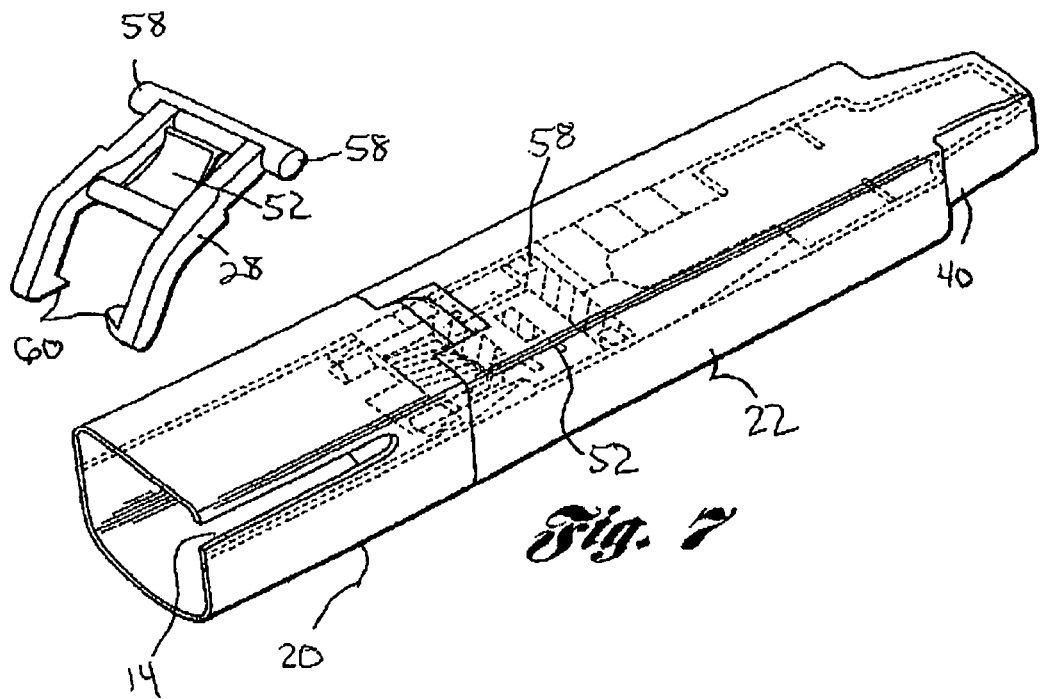
FIG. 7 shows a linkage used in an end cap of the present invention.
Figure 8:
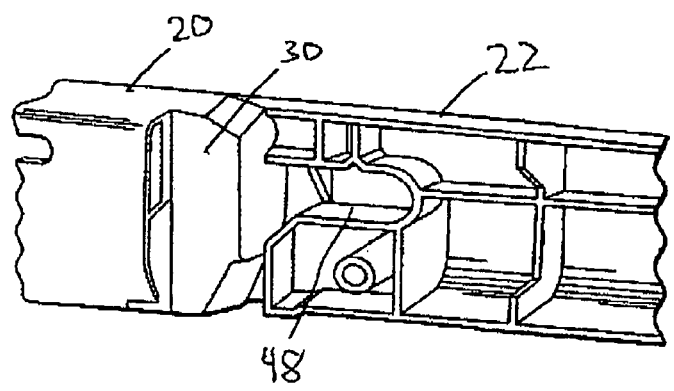
FIG. 8 shows partial cutaway views of an end cap according to the present invention.

FIGS. 1 through 8 show a folding end cap 10 according to an embodiment of the present invention. The end cap 10 has a slot 14 arranged in one surface thereof. The slot 14 is arranged adjacent to an open end of the end cap 10. Generally, the end cap 10 is made of a hollow plastic body formed by injection molding or some other suitable or well known process. Although it should be appreciated that the end cap 10 may be formed or stamped metal, ceramic, any other type of plastic, composite or natural material depending on the design requirements of the end cap 10. In the embodiment shown, the end cap 10 is mounted at one or both ends of a shade assembly 12 for use in a vehicle interior. The vehicle shade assembly 12 includes a roller 16 and a shade panel 18 attached at one end thereof to the roller 16. The roller 16 is arranged within the end cap 10 such that the end cap 10 will preferably position and secure the roller 16 and shade panel 18 within the vehicle interior for deployment of the flexible shade panel 18 over a predetermined portion of the vehicle such as a cargo area or the like. The slot 14 in the end cap 10 will receive and allow for a portion or edge of the flexible shade panel 18 to wind and unwind around the roller 16 thus allowing the shade panel 18 to pass therethrough while the end cap 10 secures the shade assembly 12 within the motor vehicle without disturbing the shade panel 18 in its extended or stored positions. In one embodiment the end cap 10 is fixed to the shade assembly 12 and in another contemplated embodiment a cassette (not shown) may be arranged over the roller 16 and shade panel 18 and engages the end cap 10 at a predetermined portion thereof or by having the end cap 10 arranged over the cassette thus providing further protection to the shade panel 18 within the shade assembly 12 of the automotive vehicle.

The folding end cap 10 according to the present invention includes a base 20 and an extension 22. The base 20, as described above, includes a slot 14 therein and generally has a hollow body. The base 20 includes a first and second end slot 24, 26 arranged in an end of the base 20 that will allow for a linkage 28 to be pivotally connected to the base 20 through the slots 24, 26 in the end thereof. The base 20 also includes a knob or boss 30 extending from an end thereof adjacent to the first and second slots 24, 26. The base 20 includes a first and second orifice or cavity 32 arranged on an inside surface thereof which will be used to receive the linkage 28 therein. This will allow the linkage 28 to pivot or rotate with respect to the base 20. The base 20 has a rib 34 extending from an inside surface thereof a predetermined distance and with the rib 34 having a predetermined length. The base 20 has extending from a surface thereof a raised member or peg 36. The raised member or peg 36 may be used to interact with the extension 22 of the end cap 10 to secure the extension 22 to the base 20 when the end cap 10 is in its second or folded position. It should be noted that in one embodiment the raised member or peg 36 generally has the shape of a square, however any other shape including triangular, rectangular, octagonal, circular, a random shape or the like may be used for the raised member 36. It should further be noted that the rib 34 extending from an inside surface thereof of the base 20 may have a corresponding rib on the opposite inside surface thereof to allow for a first and second rib 34 to extend in an inward direction from an inside surface of the base 20. It should also be noted that the orifice or cavity 32 to which the linkage 28 is pivotally connected may be formed in an inside portion of the base 20 or may be formed in a tab 38 that extends from a surface of the base 20.

The folding end cap 10 also includes an extension 22. The extension 22 generally is a hollow plastic body formed by injection molding or some other suitable process. It should also be noted that the extension 22 may be formed or stamped metal, and any other plastic, ceramic, composite or natural material depending on the design requirements. The extension 22 will include a boss or knob 40 extending from an end thereof. This boss or knob 40 will be used to mate with an interior portion of the vehicle when the end cap 10 is in its standard or first position. The extension 22 will include a first and second flange 42, 44 extending from an end opposite of the boss 40. The first and second flange 42, 44 will each include a groove 46 arranged on an outer surface thereof. The groove 46 will correspond to the shape of the rib 34 extending from an inner surface of the base 20. The first and second flanges 42, 44 will be arranged within the first and second end slots 24, 26 arranged in the end of the base 20 when the end cap 10 is in its standard position. The groove 46 will interact with one of the ribs 34 of the base 20 thus allowing for a secure engagement between the base 20 and extension 22 when the end cap 10 is in its first or standard position. This will allow for the end cap 10 to be used at its full length during operation of the shade assembly 12 in predetermined vehicle interiors. It should be noted that it is also contemplated to have the rib 34 arranged on the flanges 44, 46 of the extension 22 and a groove 46 arranged on an inner surface of the base 20 depending on the design requirements of the folding end cap 10. The extension 22 may also include a track 48 arranged within an inner surface thereof. The track 48 generally will have an oval shape and will have a predetermined length. It should be noted that the track 48 may be of any known shape including circular, square, triangular or any random shape depending on the design requirements for the folding end cap 10. The track 48 may include an indentation 50 along one surface thereof for interaction with a finger 52 extending from the linkage 28 of the end cap 10. The first and second end of the track 48 may act as a stop for the linkage 28 that connects the extension 22 to the base 20. The extension 22 may also include an angled surface 54 on an interior surface thereof which will allow for a rotation or pivoting of approximately 180° for the extension 22 from its standard position to its folded or second position. This angled surface 54 will align with a portion of the linkage 28 when the end cap 10 is in its folded or second position. The angle can be of any known angle, depending on the design requirements for the folding end cap 10. The extension 22 may include a recessed area or cavity 56 that will mate with and interact with the raised member or peg 36 such that the raised member or peg 36 will snap or be secured within the recessed area or cavity 56 and secure the extension 22 to a predetermined surface of the base 20 when the end cap 10 is in its second or folded position.

The end cap 10 also includes a linkage 28. The linkage 28 generally is made of a plastic material, however any other metal, ceramic, plastic, composite, or natural material may be used for the linkage. The linkage 28 may have a first and second pin 38 extending in an outward direction from one end thereof. The linkage 28 may also include a first and second pin 60 extending in an inward direction on an opposite end thereof. The inward extending pins 60 will be arranged within the cavity or orifices 32 located on an inside surface or tab of the base 20. This may allow for the linkage 28 to pivot or rotate with respect to the base 20. The outward extending pin 58 located on the opposite end of the linkage 28 will be arranged within and slidingly movable within the track 48 of the extension 22. The pins 58 will ride and travel along the track 48 between the standard or first position and the folded or second position of the end cap 10. The linkage 28 may include a finger 52 extending from a mid position rib of the linkage 28. The finger 52 may interact with the indentation 50 of the track 48 of the extension 22 when the end cap 10 is in its standard or first position. The finger 52 may allow for noise reduction of the end cap 10 during normal usage and movement between the standard position and folded position. Furthermore, the finger 52 may partially assist in holding and securing the extension 22 to the base 20 in both the standard position and the folded position. The linkage 28 may have a predetermined angled bend therein. The predetermined angled bend will create an angle for the linkage 28 that will generally mimic that of the angled surface 54 on the interior surface of the extension 22. This will allow for the extension 22 to flip and snap into the second or folded position via the linkage 28 which has one end fixed with relation to the base 20 and the other end movable with relation to the extension 22 and the track 48 as described above. It should be noted that the linkage 28 allows for the extension 22 to pivot in an approximate 180° arc with relation to the base 20 via the pins 58 arranged within the track 48 of the extension 22. However, any other known rotational arc between 0° and 360° may also be used. Thus, the extension 22 rotates with relation to the linkage 28 on one end thereof while the linkage 28 rotates with respect to the base 20 on the opposite end thereof. The finger 52 of the linkage 28 may have a predetermined curve therein and an angled lip on an end thereof. It should be noted that the linkage 28 and finger 52 may be formed or extruded as a single piece or the finger 52 may be added as a separate piece or not used at all depending on the design requirements for the end cap 10. It should be noted that the extension 22 may be molded as a single piece or may be molded as two separate pieces that are connected and secured to one another via any known fastening technique after the outward extending pins 58 are arranged within the track 48 of the extension 22.

In operation, the folding end cap 10 is generally used on either one or both ends of a shade assembly 12 depending on the design requirements and length differences needed within an automotive vehicle or across vehicle lines. In its standard position the grooves 46 of the extension 22 interact with and mate with the ribs 34 of the base 20 thus securing the extension 22 to the base 20. In the standard position, the linkage 28 is arranged at the outboard end of the track 48. In this position the boss 40 extending from an end of the extension 22 will interact with an interior portion of the vehicle to secure the end cap 10 and hence the shade assembly 12 within the vehicle at a predetermined position. When the vehicle user wants to adjust or reduce the length of the end cap 10, the user will pull the extension 22 in a linear direction away from the end of the base 20 thus moving the linkage 28 in a linear direction along the track 48 of the extension 22 until the linkage pins 58 engage with the inboard end of the track 48. Once the extension 22 is pulled away or apart from the base 20, the operator will flip, rotate or pivot the extension 22 in an approximate 180° arc such that the extension 22 is folded back over and engages with a surface of the base 20 such that the raised member or peg 36 of the base 20 interacts with and mates with the extension 22 thus securing and locking the extension 22 to the base 20 via the interaction of the recessed area 56 and raised member 36. This will allow for an effective reduction in length of the end cap 10 and hence effective reduction in length of the overall shade assembly 12. The boss 30 arranged on an outside end surface of the base 20 will then be used to interact with and engage a predetermined portion of the interior of a vehicle thus allowing for the shade assembly 12 to operate in the same manner as that described above for the end cap 10 in a standard position. The operation of the end cap 10 in either the folded position or standard position will not affect the winding and unwinding of the shade panel 18 from the roller 16 tube which is arranged within the base 20 of the end cap 10 as described above. The length of the extension 22 may be subtracted from the overall length of the shade assembly 12 thus allowing for the shade assembly 12 to be used in multiple positions within one vehicle or across multiple vehicle lines without having to redesign or manufacture another end cap 10 for such use. This will greatly reduce costs to automotive manufacturers by having to purchase only one shade assembly 12 having a folding end cap 10 on either one or both ends thus covering an entire vehicle line or all vehicles within an entire automobile manufacturing company. It should also be noted that to return the end cap 10 to its full length or first or standard position the user would unsnap the extension 22 from the surface of the base 20 and rotate or pivot the extension 22 back to a parallel position with regard to the axis along the base 20 and extension 22 and then push the flanges 42 of the extension 22 into the slots 24, 26 in the end of the base 20 thus interacting and mating the grooves 46 with the ribs 34 on the base 20 and extension 22 thus securing the end cap 10 back in its standard or first position.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An end cap for use with a shade, said end cap comprising:
   a base;
   a linkage having a first end and a second end, said first end of said linkage is pivotally connected to said base; and
   an extension pivotally connected to said second end of said linkage, said extension engages an end of said base in a first position or said extension engages a raised member on a surface of said base in a folded position, said extension having a boss extending from an end thereof.

2. The end cap of claim 1 wherein said base having a slot therein.

3. The end cap of claim 1 wherein said base having a rib extending from an inside surface thereof.

4. The end cap of claim 3 wherein said extension having a groove therein, said groove interacts with said rib to secure said extension to said base in a standard position.

5. The end cap of claim 1 wherein said base having a boss extending from an end thereof, said boss of said base defines an end of the end cap in said folded position, said boss of said extension defines an end of the end cap in said first position.

6. The end cap of claim 1 wherein said extension having a track therein.

7. The end cap of claim 6 wherein said linkage travels in said track between said first position and said folded position.

8. The end cap of claim 7 wherein said track having a generally oval shape, each end of said oval defining in part a stop for said extension in either said first or said folded position.

9. The end cap of claim 1 wherein said extension having a recessed area in a surface thereof, said recessed area interacts and mates with said raised member when the end cap is in said folded position.

10. The end cap of claim 1 wherein one set of said outward pins travel in a track arranged in said extension.

11. The end cap of claim 1 wherein one set of said inward pins is arranged within a set of orifices or cavities, said orifices or cavities are arranged within said base.

12. The end cap of claim 1 wherein said linkage having a finger extending from a surface thereof.

13. The end cap of claim 1 wherein said extension is capable of pivoting generally 180° with respect to said base.

14. The end cap of claim 1 wherein said linkage having a mid position rib.

15. A shade assembly for use in a vehicle, said assembly comprising:
    a roller;
    a shade panel having one end attached to said roller; and
    an end cap mounted to at least one end of said roller and adapted to engage a portion of the vehicle to support said assembly therein, said end cap including:
    a base having a boss extending from an end thereof;
    a linkage having a first end and a second end, said first end of said linkage is pivotally connected to said base; and
    an extension pivotally connected to said second end of said linkage, said extension having a boss extending from an end thereof and wherein said linkage having a first and second outward pin extending in an outward direction from a first end thereof, said linkage having a first and second inward pin extending in an inward direction from a second end thereof.

16. The shade assembly of claim 15 wherein said linkage having a finger extending from a surface thereof.

17. The shade assembly of claim 15 wherein said extension having a track arranged therein.

18. The shade assembly of claim 17 wherein one end of said linkage travels within said track between a first position and a folded position of said end cap.

19. The shade assembly of claim 15 wherein said extension having a groove therein and a recessed area in an outer surface thereof.

20. The shade assembly of claim 19 wherein said base having a rib extending from an inside surface thereof, said base having a raised member extending from an outer surface thereof, said rib interacts and mates with said groove to secure the extension with relation to said base when said end cap is in a first position, said raised member interacts and mates with said recessed area to secure said extension to said base when said end cap is in a folded position.

21. The shade assembly of claim 20 wherein said extension pivots approximately 180° with respect to said base when said end cap moves from said first position to said folded position.

22. A method of changing a length of an end cap of claim 1 for use with a shade assembly in a vehicle, said method including the steps of:
    pulling an extension apart from a base in a linear direction away from an end of a said base of the end cap;
    pivoting said extension approximately 180° with respect to said base; and
    securing said extension to said base in a first position or a folded position.

* * * * *